US012025298B1

(12) United States Patent
Chen

(10) Patent No.: US 12,025,298 B1
(45) Date of Patent: Jul. 2, 2024

(54) CAMPING LAMP CONVENIENT FOR STORAGE

(71) Applicant: Shenzhen Tankron Technology Co., Ltd., Shenzhen (CN)

(72) Inventor: Zhenmei Chen, Shenzhen (CN)

(73) Assignee: Shenzhen Tankron Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/494,709

(22) Filed: Oct. 25, 2023

(30) Foreign Application Priority Data

Jun. 8, 2023 (CN) ......................... 202321456442.8

(51) Int. Cl.

| | |
|---|---|
| ***F21V 21/14*** | (2006.01) |
| ***F21V 21/22*** | (2006.01) |
| *F21L 14/02* | (2006.01) |
| *F21W 131/10* | (2006.01) |

(52) U.S. Cl.

CPC ............ *F21V 21/22* (2013.01); *F21V 21/145* (2013.01); *F21L 14/02* (2013.01); *F21W 2131/10* (2013.01)

(58) Field of Classification Search

CPC ............................ F21W 2131/10; F21L 14/02

See application file for complete search history.

(56) References Cited

U.S. PATENT DOCUMENTS

| | | | | |
|---|---|---|---|---|
| 8,087,797 | B2 * | 1/2012 | Pelletier | H05B 45/3725 362/198 |
| 2010/0182777 | A1 * | 7/2010 | Van Deursen | F21V 21/145 362/184 |
| 2014/0301066 | A1 * | 10/2014 | Inskeep | F21S 9/02 362/183 |
| 2016/0298831 | A1 * | 10/2016 | Fang | F21V 17/007 |
| 2021/0310644 | A1 * | 10/2021 | Xia | F21S 6/002 |

FOREIGN PATENT DOCUMENTS

| | | | |
|---|---|---|---|
| CN | 110207053 | * | 9/2019 |

* cited by examiner

*Primary Examiner* — Julie A Bannan

(57) ABSTRACT

Disclosed is a camping lamp convenient for storage, including a base, a fixed cylinder, a sleeve, a foldable leg assembly, a telescopic rod assembly and a lighting assembly; the fixed cylinder penetrates into the base, the lower end of the telescopic rod assembly is connected to the fixed cylinder, and the base, the fixed cylinder, and the telescopic rod assembly are coaxially disposed; the sleeve is slidably sleeved onto the telescopic rod assembly; the foldable leg assembly is foldably connection with the sleeve, and wraps the base and the fixed cylinder inside, and the lighting assembly is foldably connection with the upper end of the telescopic rod assembly; the foldable leg assembly gathered on the base and outside the fixed cylinder, the foldable leg assembly includes a plurality of accommodating slots, the lighting assembly is sleeved outside the sleeve, and the lighting assembly is gathered inside the accommodating slots.

8 Claims, 3 Drawing Sheets

CAMPING LAMP CONVENIENT FOR STORAGE

CROSS-REFERENCE TO RELATED APPLICATIONS

This application claims priority of Chinese Patent Application No. 202321456442.8, filed on Jun. 8, 2023, the entire contents of which are incorporated herein by reference.

TECHNICAL FIELD

The present disclosure relates to the technical field of camping lamps, and in particular relates to a camping lamp convenient for storage.

BACKGROUND

Camping lamps, also known as camping lanterns, are movable lamps used in outdoor campsites to provide lighting, scare away wild animals, and indicate the location of the campsites, etc. Camping lamps currently available on the market are bulky and inconvenient for users to store and carry, bringing inconvenience to the users and affecting the user experience.

SUMMARY

The present disclosure provides a camping lamp convenient for storage, aiming to solve the problems of the camping lamp hard to be stored and carried.

A camping lamp convenient for storage provided according to an embodiment of the present disclosure includes: a base, a fixed cylinder, a sleeve, a foldable leg assembly, a telescopic rod assembly and a lighting assembly; the fixed cylinder penetrates into the base, the lower end of the telescopic rod assembly is connected to the fixed cylinder, and the base, the fixed cylinder, and the telescopic rod assembly are coaxially disposed; the sleeve is sleeved onto the telescopic rod assembly in a sliding manner; the foldable leg assembly is connected to the sleeve in a foldable manner, and wraps the base and the fixed cylinder inside, and the lighting assembly is connected to the upper end of the telescopic rod assembly in a foldable manner; and the foldable leg assembly gathered on the base and outside the fixed cylinder, the foldable leg assembly includes a plurality of accommodating slots, the lighting assembly is sleeved outside the sleeve, and the lighting assembly is gathered inside the accommodating slots to form a columnar member convenient for storage.

In the camping lamp convenient for storage provided in the present disclosure, the foldable leg assembly includes a plurality of leg frames, upper ends of the leg frames are connected to the sleeve in a rotational manner, and lower ends of the leg frames are connected to the lower end of the base in a detachable manner.

In the camping lamp convenient for storage provided in the present disclosure, the lower end of each of the leg frame is provided with a first snap-fitting portion, a first slot portion is arranged at a position of the base corresponding to the first snap-fitting portion, and the first snap-fitting portion is snapped into the first slot portion.

The camping lamp convenient for storage provided in the present disclosure further includes a plurality of support frames, the number of support frames is the same as that of the leg frames, one end of each of the support frames is connected to the lower end of the base in a rotational manner, and the other end of each of the support frames is connected to the leg frames in a rotational manner.

The camping lamp convenient for storage provided in the present disclosure further includes a connecting member, where the connecting member is mounted to the upper end of the telescopic rod assembly, and the lighting assembly is connected to the connecting member in a rotational manner.

In the camping lamp convenient for storage provided in the present disclosure, the lighting assembly includes a plurality of lighting units, one end of each of the lighting units is connected to the connecting member in a rotational manner, and the other end of each of the lighting units is snapped onto the base.

In the camping lamp convenient for storage provided in the present disclosure, a second slot portion is arranged at one end of each of the lighting units that matches the base, a second snap-fitting portion, a button and an elastic member are arranged at a position of the base corresponding to the second slot portion, the button is arranged outside the second snap-fitting portion, one end of the elastic member abuts against the button, the other end thereof abuts against the base, and the second snap-fitting portion and the second slot portion are arranged in a snap-fitting manner.

In the camping lamp convenient for storage provided in the present disclosure, the numbers of the leg frames and the lighting units are three, respectively, the three leg frames are evenly spaced around a center axis of the base, and the three lighting units are also evenly spaced around the center axis of the base.

The technical solution provided in the embodiments of the present disclosure may have the following beneficial effects: the present disclosure provides a camping lamp convenient for storage, featuring compact structure, beautiful shape, convenient for storage and portability.

BRIEF DESCRIPTION OF THE DRAWINGS

To describe the technical solutions in the embodiments of the present disclosure more clearly, the accompanying drawings required for describing the embodiments are briefly described below. Obviously, the accompanying drawings in the following description show merely some embodiments of the present disclosure, and those of ordinary skill in the art would also be able to derive other accompanying drawings from these accompanying drawings without creative efforts.

DESCRIPTION OF REFERENCE NUMERALS

10. base; 11. first slot portion; 12. button; 13. second snap-fitting portion; 20. fixed cylinder; 30. sleeve; 31. connector; 40. foldable leg assembly; 41. accommodating slot; 42. leg frame; 421. connecting plate; 422. rotatable shaft; 423. first snap-fitting portion; 50. telescopic rod assembly; 60. lighting assembly; 61. lighting unit; 611. second snap-fitting portion; 70. support frame; and 80 connecting member.

DETAILED DESCRIPTIONS OF THE EMBODIMENTS

The technical solutions in the embodiments of the present disclosure will be described below clearly and comprehensively in conjunction with the accompanying drawings in the embodiments of the present disclosure. It is obvious that the embodiments described constitute a part of, not all of, embodiments of the present disclosure. All other embodiments obtained by those of ordinary skill in the art based on the embodiments of the present disclosure without making creative efforts fall within the scope of protection of the present disclosure.

It should also be understood that the terms used herein in the specification of the present disclosure are used only for the purpose of describing particular embodiments and are not intended to limit the present disclosure. As used in the specification of the present disclosure and the appended claims, the singular forms "a," an," and "the" are intended to include the plural forms, unless the context clearly indicates otherwise.

It should be further understood that the term "and/or" as used in the specification of the present disclosure and the appended claims refers to any and all combinations of one or more of the associated listed items, and includes these combinations.

Figure 1:
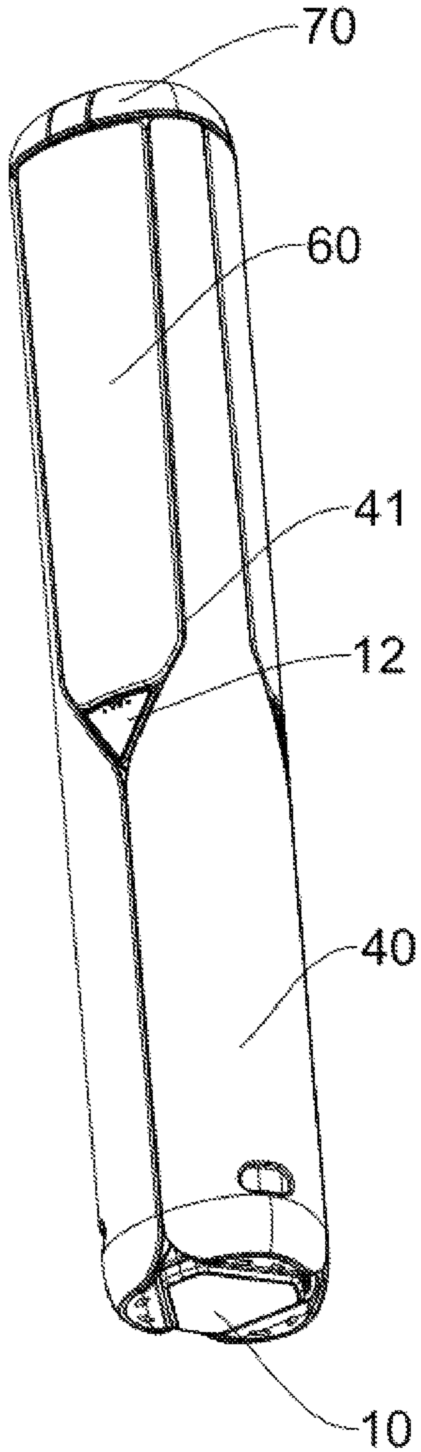
FIG. 1 is a schematic structural diagram of a camping lamp convenient for storage according to an embodiment of the present disclosure.
Figure 2:
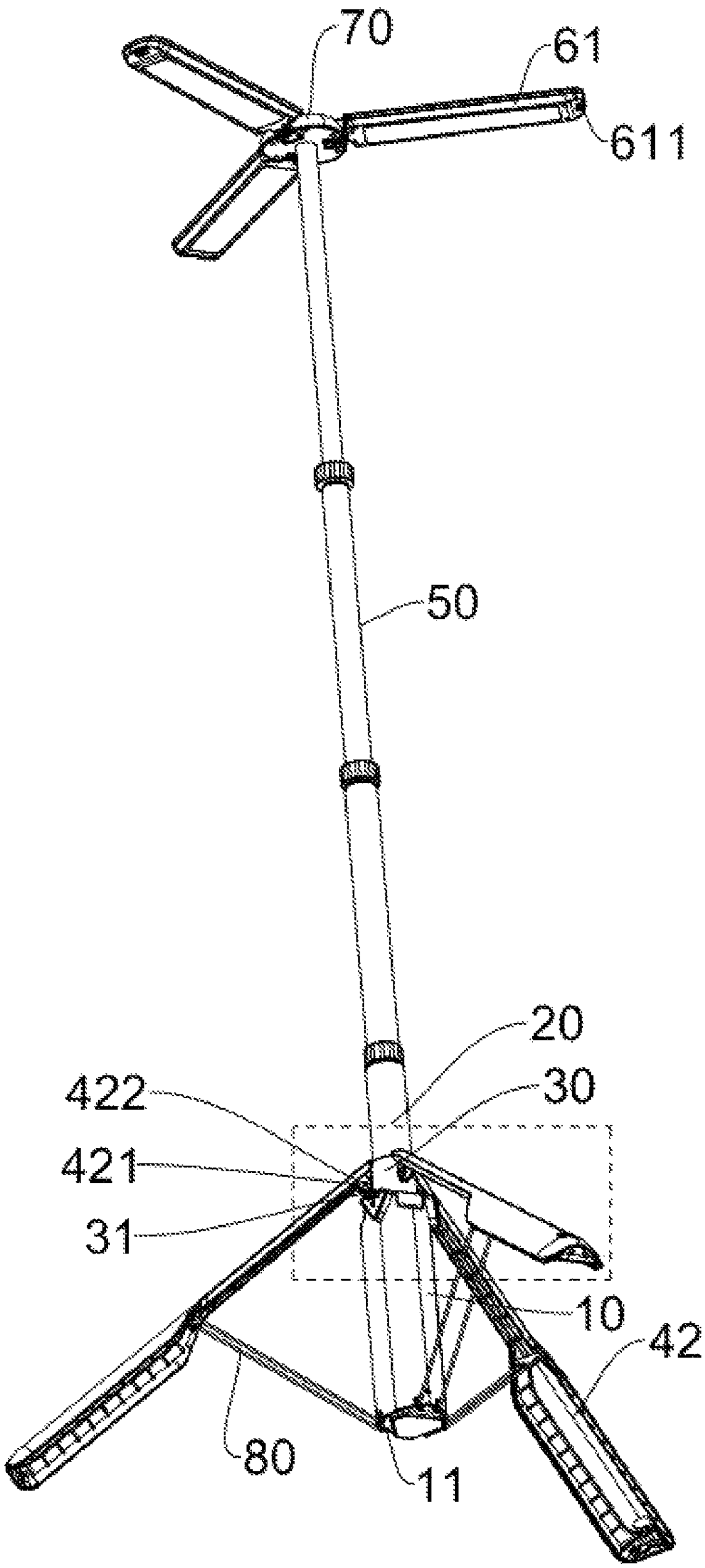
FIG. 2 is a schematic structural diagram of an unfolding state of a camping lamp convenient for storage according to an embodiment of the present disclosure.
Figure 3:
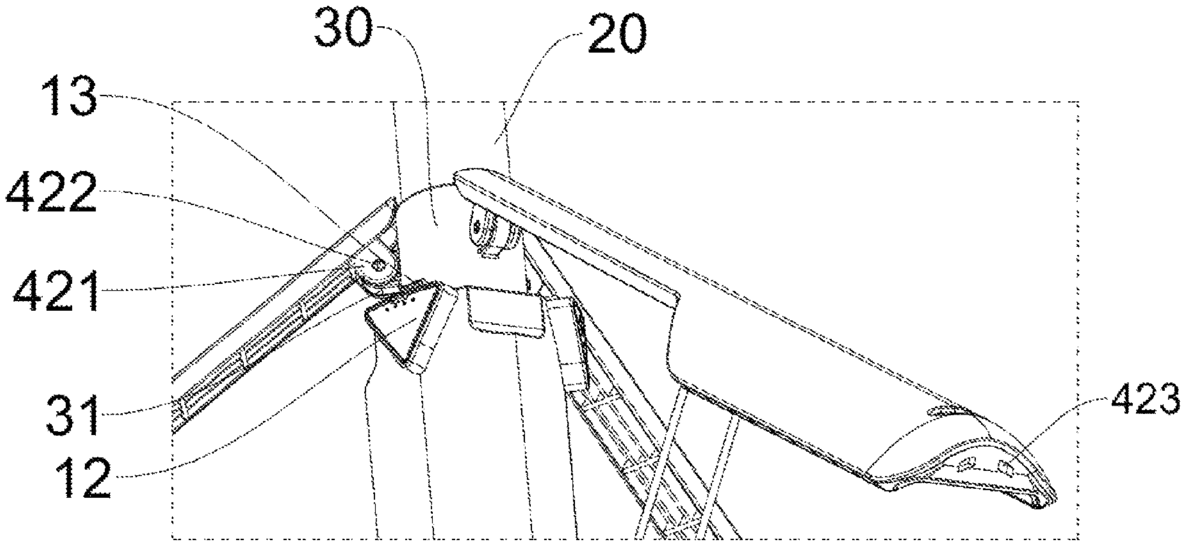
FIG. 3 is a partial enlarged view of the dashed area in FIG. 2.

With reference to FIGS. 1-3, the present disclosure discloses a camping lamp convenient for storage, including a base 10, a fixed cylinder 20, a sleeve 30, a foldable leg assembly 40, a telescopic rod assembly 50 and a lighting assembly 60. The fixed cylinder 20 penetrates into the base 10, and the lower end of the telescopic rod assembly 50 is connected to the fixed cylinder 20. The base 10, the fixed cylinder 20, and the telescopic rod assembly 50 are coaxially disposed, a telescopic rod is disposed above the fixed cylinder 20, and the fixed cylinder 20 is disposed at an upper portion of the base 10. The sleeve 30 is sleeved onto the telescopic rod assembly 50, and the sleeve 30 can slide along the telescopic rod assembly 50 and the fixed cylinder 20. The foldable leg assembly 40 is connected to the sleeve in a foldable manner 30, and wraps the base and the fixed cylinder inside. The lighting assembly 60 is connected to the upper end of the telescopic rod assembly 50 in a foldable manner and can wrap the telescopic rod assembly inside.

The foldable leg assembly 40 is gathered on the base 10, and outside the fixed cylinder 20 (that is, the foldable leg assembly 40 is turned to be parallel to an axis of the base 10 and is attached to the outer surface of the base), the foldable leg assembly 40 includes a plurality of accommodating slots 41, the lighting assembly 60 is sleeved outside the sleeve 30, and the lighting assembly 60 is gathered inside the accommodating slots 41 to form a columnar member convenient for storage.

In an optional embodiment, the camping lamp further includes a connecting member 80, where the connecting member 80 is mounted to the upper end of the telescopic rod, and the lighting assembly 60 is connected to the connecting member 80 in a rotational manner. Specifically, the connecting member 80 is mounted to the upper end of the telescopic rod assembly 50, the connecting member 80 includes three slotted portions, and each lighting unit 61 of the lighting assembly 60 is rotatably disposed inside the slotted portions, respectively, such that the lighting units 61 is capable of rotation to realize unfolding and folding operations.

The foldable leg assembly 40 includes a plurality of leg frames 42, upper ends of the leg frames 42 are connected to the sleeve 30 in a rotational manner, and lower ends of the leg frames 42 are connected to the lower end of the base 10 in a detachable manner. A detachable structure between the leg frames and the base can be realized in a snap-fitting manner, a first snap-fitting portion 423 is arranged at the lower portion of each leg frame 42, and a first slot portion 11 is arranged at a position of the base 10 corresponding to the snap-fitting portion, such that the assembly and disassembly can be realized conveniently through suitable settings. The lighting assembly 60 includes a plurality of lighting units 61, one end of each of the lighting units 61 is connected to the connecting member 80 in a rotational manner, and the other end of each of the lighting units 61 is snapped onto the base 10. A snap-onto structure between the lighting units and the base can be realized in a snap-fitting manner, a second slot portion 611 is arranged at one end of each of the lighting units 61 that matches the base, a button 12 and a second snap-fitting portion 13 are arranged on the base 10, the second snap-fitting portion provides elastic force through an elastic member (not shown in the drawings) to make the second snap-fitting portion snap-fitting the second slot portion, the button is arranged outside the second snap-fitting portion, the button is pressed to drive the second snap-fitting portion to move and compress the elastic member, such that the second snap-fitting portion is disengaged from the second slot portion, thereby opening the second snap-fitting portion and the second slot portion.

The sleeve 30 is provided with a plurality of connectors 31, and the upper end of each of the leg frames 42 includes a connecting plate 421, and penetrates through the connecting plate 421 and the connectors 31 through a rotatable shaft 422, such that the leg frames leg frames 42 are capable of rotating around the connectors 31 on the sleeve 30.

Three leg frames 42 can be arranged, the three leg frames 42 are evenly spaced around a center axis of the base 10, and the three leg frames 42 are wrapped around the outside of the fixed cylinder 20 of the base 10 to form a complete cylindrical side or an elliptic cylinder side. Three lighting units 61 can also be arranged, the three lighting units 61 are evenly spaced around the center axis of the base 10, and the three lighting units 61 are wrapped around the outside of the telescopic rod assembly 50 to wrap the telescopic rod assembly 50 inside. One accommodating slot 41 is arranged between two adjacent leg frames 42, and the three lighting units 61 are each accommodated in the accommodating slots 41. The device has a compact overall structure and beautiful shape, which improves the user's experience.

When the device in the present disclosure is in use, the snap-fitting parts at the lower ends of the lighting units 61 are opened, and the lighting units 61 are then pulled upwards to drive the telescopic rod assembly 50 to stretch and telescope; the lower ends of the leg frames 42 are disassembled to make the leg frames 42 be in a free state, and in this case, the leg frames 42 are rotated to make the three leg frames 42 opened, such that two devices can be placed on a plane to facilitate a user's usage of the devices outdoors. When being stored, the lighting units 61 are rotated to the state of wrapping the telescopic rod, the telescopic rod is then telescoped into the base 10, and the leg frames 42 are subsequently rotated to a state of wrapping the base 10, such that the device is folded into a columnar member featuring a compact structure and beautiful shape, thereby facilitating the storage by the user, reducing the storage space, and improving the user experience.

In an optional embodiment, the camping lamp further includes a plurality of support frames 70, the number of support frames 70 is the same as that of the leg frames 42, one end of each of the support frames 70 is connected to the lower end of the base 10 in a rotational manner, and the other end of each of the support frames 70 is connected to the leg frames 42 in a rotational manner. Each of the support frames 70 corresponds to one leg frame 42, and a position between the leg frame 42 and the base 10 is positioned through the support frame 70, so as to ensure that the leg frames 42 are in a stable state and to maintain the stability of the entire device.

It should be noted that the base 10 and the fixed cylinder 20 are hollow structures, the lower end of the fixed cylinder 20 penetrates into the base 10, and the telescopic rod can be stored inside the hollow space of the base 10 and the fixed cylinder 20. Since the technology of the telescopic rod is very mature, it will not be repeated here.

The foregoing is only a specific implementation of the present disclosure, but the scope of protection of the present disclosure is not limited thereto, Any various equivalent modifications or substitutions that may be easily conceived by any technicians familiar with the technical field within the technical scope disclosed by the present disclosure should be covered within the scope of protection of the present disclosure. Therefore, the scope of protection of the present disclosure shall be subject to that of the claims.

The invention claimed is:

1. A camping lamp convenient for storage provided according to an embodiment of the present disclosure comprises: a base, a fixed cylinder, a sleeve, a foldable leg assembly, a telescopic rod assembly and a lighting assembly; the fixed cylinder penetrates into the base, the lower end of the telescopic rod assembly is connected to the fixed cylinder, and the base, the fixed cylinder, and the telescopic rod assembly are coaxially disposed; the sleeve is sleeved onto the telescopic rod assembly in a sliding manner; the foldable leg assembly is in foldable connection with the sleeve, and wraps the base and the fixed cylinder inside, and the lighting assembly is in foldable connection with the upper end of the telescopic rod assembly; and the foldable leg assembly gathered on the base and outside the fixed cylinder, the foldable leg assembly comprises a plurality of accommodating slots, the lighting assembly is sleeved outside the sleeve, and the lighting assembly is gathered inside the accommodating slots to form a columnar member convenient for storage.

2. The camping lamp convenient for storage according to claim 1, wherein the foldable leg assembly comprises a plurality of leg frames, upper ends of the leg frames are connected to the sleeve in a rotational manner, and lower ends of the leg frames are connected to the lower end of the base in a detachable manner.

3. The camping lamp convenient for storage according to claim 1, wherein the lower end of each of the leg frame is provided with a first snap-fitting portion, a first slot portion is arranged at a position of the base corresponding to the first snap-fitting portion, and the first snap-fitting portion is snapped into the first slot portion.

4. The camping lamp convenient for storage according to claim 2, wherein the camping lamp further comprises a plurality of support frames, the number of support frames is the same as that of the leg frames, one end of each of the support frames is connected to the lower end of the base in a rotational manner, and the other end of each of the support frames is connected to the leg frames in a rotational manner.

5. The camping lamp convenient for storage according to claim 4, wherein the camping lamp further comprises a connecting member, the connecting member is mounted to the upper end of the telescopic rod assembly, and the lighting assembly is connected to the connecting member in a rotational manner.

6. The camping lamp convenient for storage according to claim 5, wherein the lighting assembly comprises a plurality of lighting units, one end of each of the lighting units is connected to the connecting member in a rotational manner, and the other end of each of the lighting units is snapped onto the base.

7. The camping lamp convenient for storage according to claim 6, wherein a second slot portion is arranged at one end of each of the lighting units that matches the base, a second snap-fitting portion, a button and an elastic member are arranged at a position of the base corresponding to the second slot portion, the button is arranged outside the second snap-fitting portion, one end of the elastic member abuts against the button, the other end thereof abuts against the base, and the second snap-fitting portion and the second slot portion are arranged in a snap-fitting manner.

8. The camping lamp convenient for storage according to claim 7, wherein the numbers of the leg frames and the lighting units are three, respectively, the three leg frames are evenly spaced around a center axis of the base, and the three lighting units are also evenly spaced around the center axis of the base.

* * * * *